(12) United States Patent
Leitner et al.

(10) Patent No.: US 11,592,645 B2
(45) Date of Patent: Feb. 28, 2023

(54) BINOCULARS AND METHOD FOR ADJUSTING AN INTERPUPILLARY DISTANCE

(71) Applicant: Swarovski-Optik AG & Co KG, Absam (AT)

(72) Inventors: Martin Leitner, Innsbruck (AT); Lukas Klingenschmid, Wattens (AT)

(73) Assignee: Swarovski-Optik AG & Co KG.

( * ) Notice: Subject to any disclaimer, the term of this patent is extended or adjusted under 35 U.S.C. 154(b) by 209 days.

(21) Appl. No.: 16/906,389

(22) Filed: Jun. 19, 2020

(65) Prior Publication Data
US 2021/0011253 A1 Jan. 14, 2021

(30) Foreign Application Priority Data
Jun. 26, 2019 (AT) .................. A 50569/2019

(51) Int. Cl.
*G02B 7/12* (2021.01)
*G02B 7/06* (2021.01)
*G02B 23/12* (2006.01)
*G02B 23/18* (2006.01)

(52) U.S. Cl.
CPC .............. *G02B 7/12* (2013.01); *G02B 7/06* (2013.01); *G02B 23/12* (2013.01); *G02B 23/18* (2013.01)

(58) Field of Classification Search
CPC ... G02B 7/12; G02B 7/06; G02B 3/12; G02B 3/18
See application file for complete search history.

(56) References Cited

U.S. PATENT DOCUMENTS

| | | | |
|---|---|---|---|
| 9,025,040 B2 * | 5/2015 | Thyssen | F41G 3/165 235/407 |
| 10,088,648 B2 | 10/2018 | Yamamoto | |
| 2001/0046085 A1 * | 11/2001 | Boys | G02B 7/06 359/410 |
| 2004/0257648 A1 | 12/2004 | Mogamiya | |
| 2007/0053056 A1 | 3/2007 | Charlesworth | |

(Continued)

FOREIGN PATENT DOCUMENTS

| | | | | |
|---|---|---|---|---|
| DE | 102012200514 A1 | 7/2013 | | |
| DE | WO 2014108428 | * | 7/2014 | ............. G02B 23/02 |

(Continued)

*Primary Examiner* — William R Alexander
*Assistant Examiner* — Sharrief I Broome
(74) *Attorney, Agent, or Firm* — Lerner, David, Littenberg, Krumholz & Mentlik, LLP

(57) ABSTRACT

The invention relates to binoculars and a method for adjusting an interpupillary distance of binoculars, comprising a first housing half having a first eyepiece with a first optical axis, a second housing half having a second eyepiece with a second optical axis, wherein the distance of the first optical axis to the second optical axis defines an interpupillary distance and wherein the first housing half and the second housing half are hingedly connected to each other by means of at least one folding bridge and wherein the folding bridge comprises a first folding bridge portio coupled with the first housing half and a second folding bridge portion coupled with the second housing half and wherein the interpupillary distance may be changed by pivoting the two housing halves and wherein a detection device is formed, by means of which the interpupillary distance may be determined.

4 Claims, 8 Drawing Sheets

(56) References Cited

U.S. PATENT DOCUMENTS

| | | | |
|---|---|---|---|
| 2011/0128619 A1* | 6/2011 | Pernstich | G02B 23/04 |
| | | | 359/407 |
| 2015/0002938 A1 | 1/2015 | Bach | |
| 2015/0015944 A1* | 1/2015 | Schmitt | G02B 7/12 |
| | | | 359/408 |
| 2016/0180534 A1 | 6/2016 | Ernst et al. | |
| 2016/0313550 A1* | 10/2016 | Pernstich | G01S 7/4812 |

FOREIGN PATENT DOCUMENTS

| | | |
|---|---|---|
| DE | 102014119580 A1 | 6/2016 |
| EP | 2824492 A1 | 1/2015 |
| GB | 2416857 A | 2/2006 |
| JP | 2002116386 A | 4/2002 |

* cited by examiner

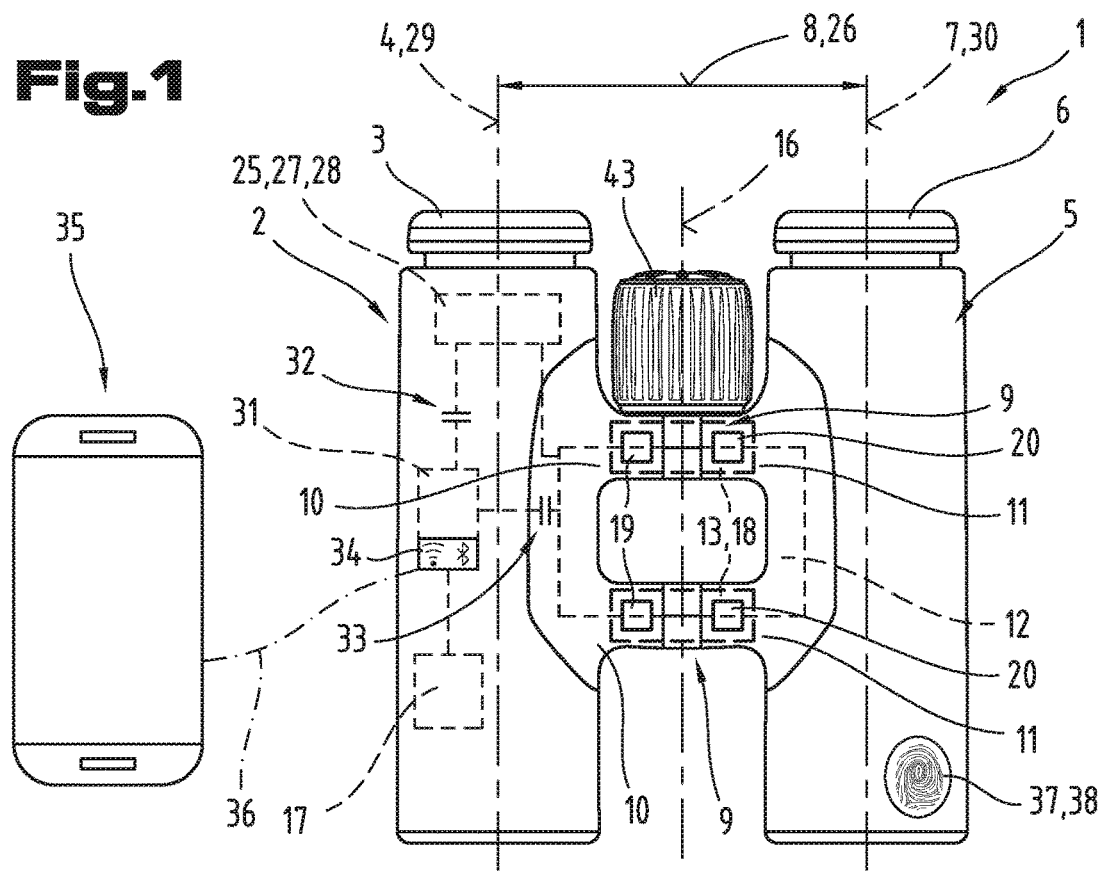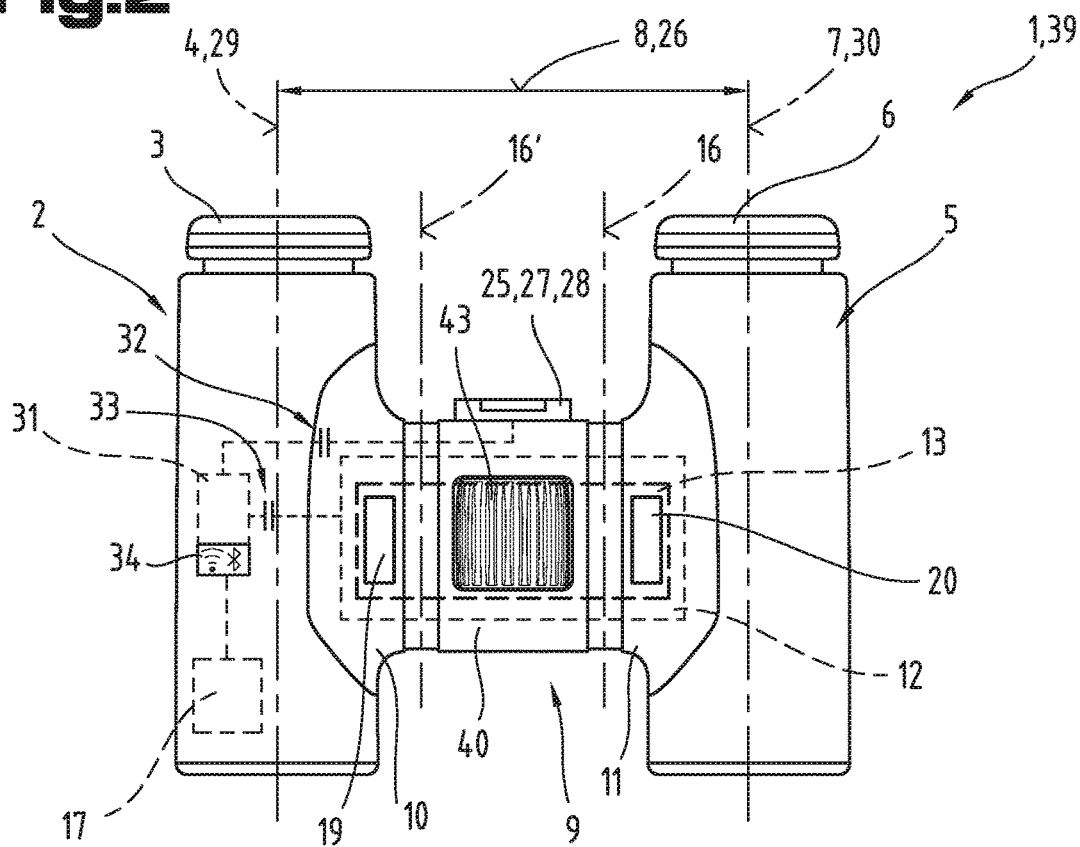

Fig.8
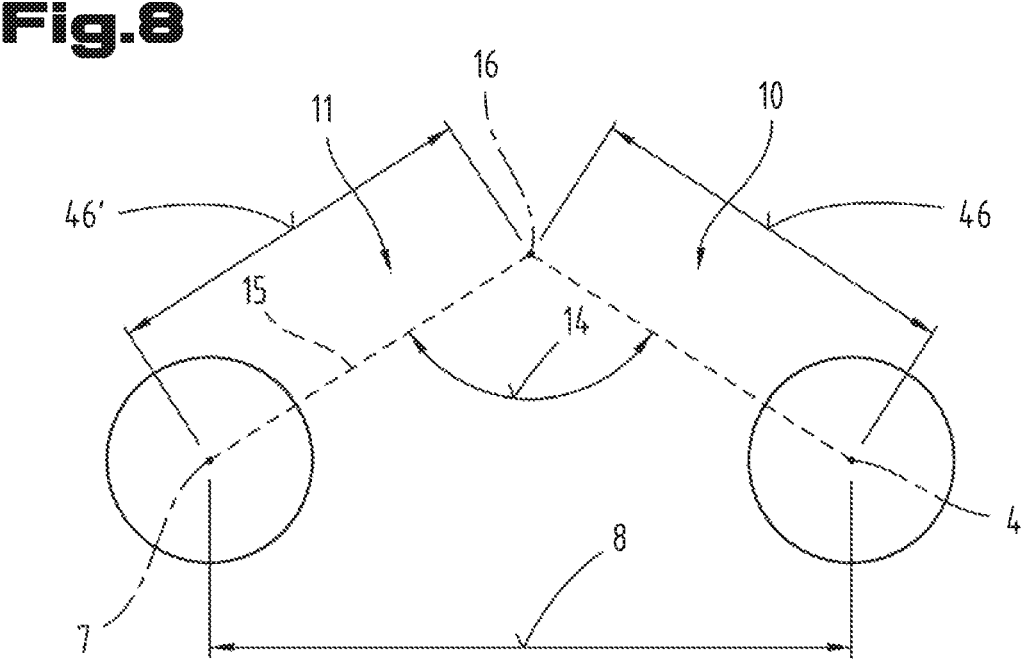
| folding bridge [°] | interpupillary distance [mm] |
|---|---|
| 80 | 51,4 |
| 85 | 54,0 |
| 90 | 56,6 |
| 95 | 59,0 |
| 100 | 61,3 |
| 105 | 63,5 |
| 110 | 65,5 |
| 115 | 67,5 |
| 120 | 69,3 |
| 125 | 71,0 |
| 130 | 72,5 |
| 135 | 73,9 |
| 140 | 75,2 |

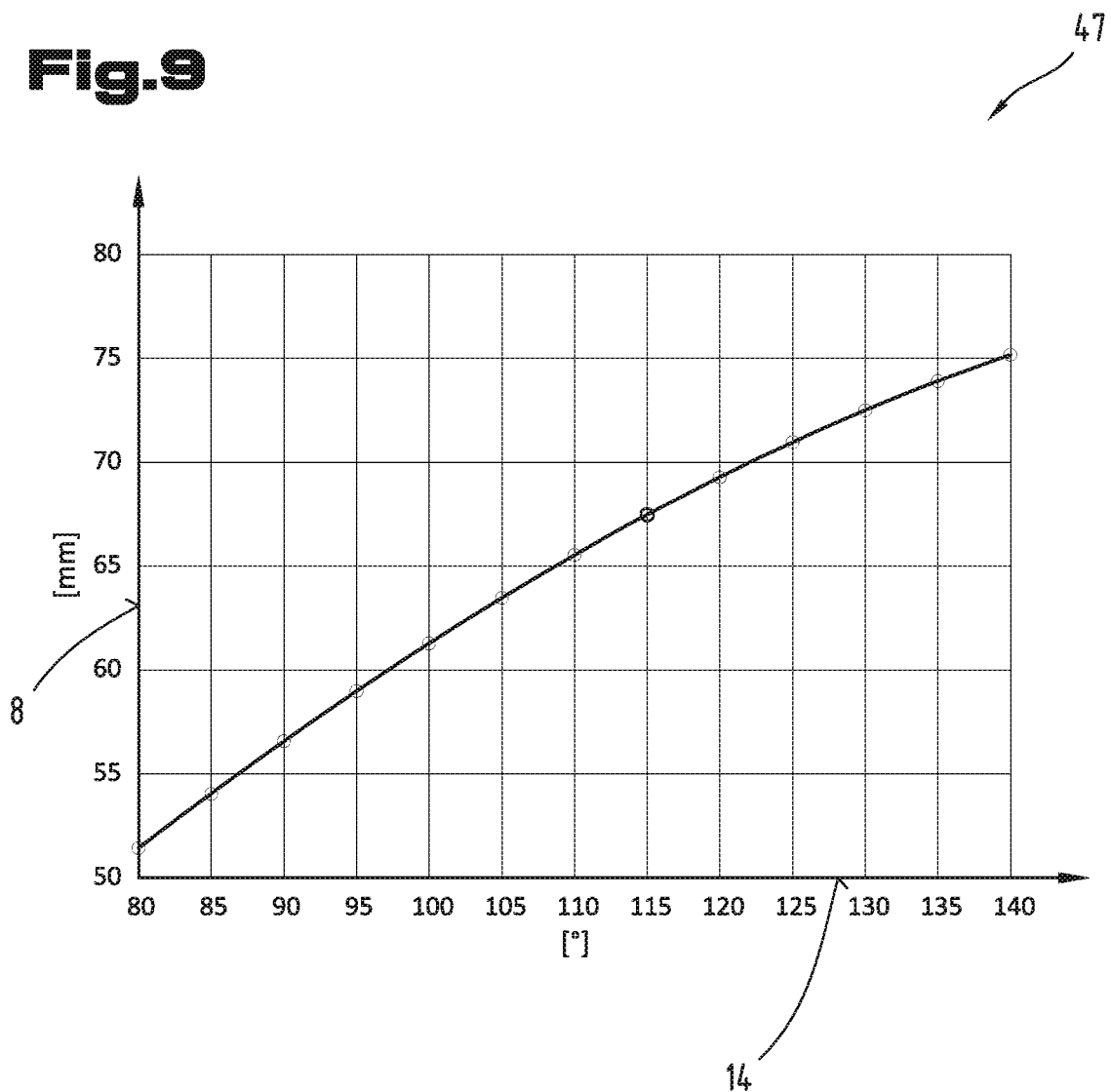

BINOCULARS AND METHOD FOR ADJUSTING AN INTERPUPILLARY DISTANCE

CROSS REFERENCE TO RELATED APPLICATIONS

The present application claims priority from Austrian Patent Application No. A 50569/2019 filed Jun. 26, 2019, the disclosure of which is hereby incorporated herein by reference.

BACKGROUND

The invention relates to binoculars and a method for adjusting an interpupillary distance of binoculars.

Binocular telescopes, which are also referred to as binoculars or field glasses, serve for hands-free observation of distant objects. Such products have been in use for more than a century and are used, for example, for leisure, hunting and military purposes. They usually consist of 2 tubes configured in a mirror-symmetric manner and arranged pivotably against each other around a joint pivot axis, which is also referred to as folding axis. Said tubes consist of a pair of eyepieces on the observer side and a pair of objective lenses on the object side. Usually, these are optical lens systems. Between the eyepiece and objective lens assemblies, an erecting system is arranged, whose construction (e.g. as a lens system, roof edge prism system, Porro prism system or mirror system) determines the essential shape of the binoculars.

For adjusting binoculars to the individual interpupillary distance of a user in order to achieve a pleasant viewing experience, it is known to pivot the two tubes of binoculars around the folding axis.

From EP 2824492 A1, binoculars having a folding bridge for adapting the distance between the eyepieces to the distance between the eyes of the user are known, wherein the folding bridge comprises a joint by means of which the left-hand and the right-hand tubes are pivotably connected to each other for adapting, by means of the pivoting movement of the folding bridge, the distance of the left-hand and the right-hand tubes to the individual distance between the eyes of the user.

U.S. Ser. No. 10/088,648 B2 shows an adjusting device for the interpupillary distance of binoculars, wherein different click positions of the adjusting device are provided for different angles of rotation.

US 2007053056 A1 shows binoculars with image orientation, wherein first and second tubes are configured adjustably relative to one another in order to adjust an interpupillary distance between the eyes of a user. In the binoculars, means are provided whereby adjustment between the first and second tubes can be taken into account when capturing the image so as to reduce the problems caused by the angular adjustment.

When binoculars are stowed or transported, they are usually folded to minimum housing dimensions. The interpupillary distance is thus adjusted to a minimum via a folding axis of a folding bridge and consequently no longer corresponds to the optimal interpupillary distance of the user. If the binoculars are now to be unfolded again for use, the user should to be able to do this quickly and comfortably, and the interpupillary space of the binoculars which is optimal for the user should be achieved again.

BRIEF SUMMARY

It is the object of the present invention to overcome the disadvantages of the prior art and to provide a device and method by means of which a user is able to easily and safely adapt the interpupillary distance of binoculars.

This object is achieved by a device and method according to the claims.

The invention relates to binoculars comprising a first housing half having a first eyepiece with a first optical axis, a second housing half having a second eyepiece with a second optical axis, wherein the distance of the first optical axis to the second optical axis defines an interpupillary distance and wherein the first housing half and the second housing half are hingedly connected to each other by means of at least one folding bridge and wherein the folding bridge comprises a first folding bridge portion coupled with the first housing half and a second folding bridge portion coupled with the second housing half and wherein the interpupillary distance may be changed by pivoting the two housing halves and wherein a detection device is formed, by means of which the interpupillary distance may be determined.

The interpupillary distance is the abstraction of the interpupillary space (distance between the parallel optical axes of the first and second eyepieces). In binoculars, the interpupillary distance may usually be adjusted in a range of 56 mm to 72 mm. In this regard, the interpupillary distance may be changed by pivoting the two housing halves against each other or by rotating the hinged folding bridge.

The average interocular distance and the correspondingly required interpupillary distance of an adult is approximately 65 mm. With a good/appropriate adjustment of the interpupillary distance, only an image circle is visible during observation through the binoculars.

However, if the interpupillary distance has not been optimally adjusted for the respective user, two overlapping image circles are visible during observation through the binoculars, which diminishes the comfort of the user during observation and may even lead to fatigue of the user during longer observations.

The disadvantages of non-optimal adjustment of the interpupillary distance are overcome by the detection device according to the invention, by means of which the current interpupillary distance of binoculars may be determined continuously. Moreover, the user is given the opportunity to quickly and easily adjust the desired interpupillary distance in order to achieve an optimal observation experience.

By means of an output device, a target interpupillary distance reached in the scope of adjusting the interpupillary distance may be signaled, whereat the user receives a visual, tactile and/or acoustic feedback that the optimal interpupillary distance provided for them has been reached.

Furthermore, it may be appropriate if the detection device comprises at least one sensor device, by means of which a folding angle between the first folding bridge portion and the second folding bridge portion coupled therewith may be determined and wherein the interpupillary distance may be determined from the folding angle.

In this regard, a sensor device may be any angle or inclination sensor known in the art, by means of which the folding angle may be determined. Subsequently, when the folding angle is available, the interpupillary distance may preferably be easily calculated or derived by means of mathematical standard formulae.

It may further be provided that the interpupillary distance may be determined from the folding angle by means of trigonometrical calculations and/or an allocation table.

In this regard, an isosceles triangle comprises at least two sides of equal length. Thus, the two angles opposing the sides of equal length are of equal size. For complete determination, two determinants are required, at least one side of them. Every isosceles triangle is axisymmetric. It may be acute-angled, rectangular or beveled.

Thus, for complete determination of the isosceles triangle, in addition to the determinable folding angle, the length of the first folding bridge portion or the distance between the first optical axis and the folding bridge pivot axis on the one hand, and the length of the second folding bridge portion or the distance between the second optical axis and the folding bridge pivot axis on the other hand are known. In this regard, the two lengths of the folding bridge portions are of equal length, or rather the distance of the first optical axis to the folding bridge pivot axis is equal to the distance of the second optical axis to the folding bridge pivot axis.

In this connection, the entire folding angle may be composed of a first folding bridge angle (the first folding bridge portion) and a second folding bridge angle (the second folding bridge portion) or be derived therefrom. The first folding bridge angle and the second folding bridge angle can be found in relation to the axis of symmetry of the triangle.

The formula for calculating the interpupillary space based on a triangle is as follows:

$$c = 2a \times \sin\left(\frac{\gamma}{2}\right)$$

with the variable c representing the interpupillary space, the variable a representing the distance between the first or second optical axis and the folding bridge pivot axis, and the angle γ representing the folding angle.

Alternatively, in the case of compact binoculars, a trapezoid may be formed instead of a triangle. In this connection, the trapezoid is formed through the first optical axis, the second optical axis and the pivot axes of the first folding bridge portion and the second folding bridge portion as corner points. For the complete determination of the trapezoid, in addition to the folding angles of the folding bridge portions, the length of the connecting bridge between the folding bridge portions, the distance between the first optical axis and the first folding bridge pivot axis, and the distance between the second optical axis and the second folding bridge pivot axis are known.

The formula for calculating the interpupillary space based on a trapezoid, after transforming the sine rule for the trapezoid, is $$\frac{\sin(180 - \alpha - \beta)}{(a - c)} = \frac{\sin(\alpha)}{b}$$

as follows $$a = \frac{b \times \sin(-\alpha - \beta + 180) + c \times \sin(\alpha)}{\sin(\alpha)}$$

with the variable a representing the interpupillary space, the variable b and, by analogy, the variable d representing the distance between the respective optical axis and the respective folding bridge pivot axis, the variable c representing the length of the connecting bridge, and the angle γ and, by analogy, the angle δ representing the folding angle of the respective folding bridge portion.

In this regard, the angle α follows from the formula

α+δ=180 and the angle β from the formula

β+γ=180.

Arrangements of binoculars with a non-symmetrical housing construction are known as well, where either the housing halves and/or the associated folding bridge portions are configured differently. In this regard, it is necessary to calculate the folding bridge angles separately in the sense described above and therefrom determine a total folding angle.

Instead of the trigonometrical calculation, an allocation table may also be stored in the memory unit of the binoculars, from which the respective interpupillary distances may be allocated to particular folding angles. In contrast, the allocation table may also be stored or available in a mobile terminal coupled with the binoculars.

With the described formulae or the allocation table, the interpupillary distance may thus be easily determined or calculated from the folding angle.

Moreover, it may be provided that the sensor device is configured as an angle measurement sensor, by means of which the folding angle may be determined.

An angle measurement sensor may be a rotary potentiometer, for example.

In addition, an embodiment is advantageous according to which it may be provided that the sensor device comprises at least one first inclinometer and one second inclinometer, wherein the first inclinometer is formed in the first housing half and/or the first folding bridge portion coupled therewith, and the second inclinometer is formed in the second housing half and/or the first folding bridge portion coupled therewith, wherein a first folding bridge angle of the first folding bridge portion and a second folding bridge angle of the second folding bridge portion may be determined relative to a horizontal, and the folding angle may be determined from the first folding bridge angle and the second folding bridge angle.

By means of the inclinometers provided in the housing halves, the absolute inclination relative to a horizontal may thus be determined, and the folding angle may be determined from this.

In this connection, an inclinometer may be configured as an acceleration sensor for measuring the inclination, wherein the respective relative inclination may be measured by means of two acceleration sensors respectively provided in the two housing halves. From the difference, the angle at which the two acceleration sensors are inclined towards each other may be determined, said angle being the folding angle. On this basis, the interpupillary distance may in turn be determined.

According to a further development, the position of the binoculars relative to the horizontal may be determined from the first folding bridge angle and the second folding bridge angle.

For adjusting the target interpupillary distance of a user, said distance must be stored once or initially, for example in the memory unit. For this purpose, the binoculars are preferably held horizontally. In this regard, the folding angle associated with the desired target interpupillary distance for the user may also be stored in the memory unit.

Thus, it is also conceivable that the interpupillary distance is not calculated continuously from the respective folding angle in the course of an adjustment, but that only the folding angle is determined and, as soon as a particular value for the folding angle is reached, a signaling to the user is performed when a desired target interpupillary distance is reached.

Furthermore, it is conceivable that a warning signal is output if the binoculars are not held horizontally in the course of an adjustment of the interpupillary distance.

Moreover, it may be appropriate if an output device is formed, by means of which an interpupillary distance deviating from a target interpupillary distance may be signaled and/or a target interpupillary distance that may be reached in the course of adjusting the interpupillary distance may be signaled.

This way, the user of binoculars may directly receive a feedback as to whether the interpupillary distance desired by them has already been reached, which further allows easy, comfortable and quick adjustment of the binoculars. In this connection, the direction of the required adjustment may also be indicated.

In addition, it may be provided that the output device is configured as an acoustic, optical and/or tactile signaling device, by means of which the target interpupillary distance that may be reached in the course of the adjustment of the interpupillary distance may be signaled.

After binoculars have been initially set with a value for the folding angle desired for a user or the associated interpupillary distance, said value may be easily retrieved or accessed later by adjusting the two housing halves towards each other. In this regard, the folding angle or the interpupillary distance is varied until the folding angle stored in a memory unit or the stored interpupillary distance is reached. Subsequently, a signal in the form of an acoustic, optical and/or tactile signal is output by the binoculars.

Advantageously, the signaling type may be selected depending on the specific application. For example, in hunting practice, an optical and/or tactile signal is preferred to an acoustic signal.

In this regard, the tactile signal may be a defined locking position of the folding bridge by means of which the target interpupillary distance reached for the user is signaled.

It may further be provided that the output device is configured as a display, by means of which the target interpupillary distance reached in the course of the adjustment of the interpupillary distance may be signaled.

Advantageously, in this regard, in the course of the adjustment or pivoting of the housing halves of the binoculars, the current interpupillary distance is always displayed, and as soon as the target interpupillary distance is reached, the interpupillary distance is, for example, highlighted in color or enlarged in order to signal to the user that the desired target interpupillary distance has been reached.

In addition, a direction indicator may be output or shown on the display to indicate the direction of the required adjustment of the housing halves of the binoculars to the user. A direction indicator may be one or multiple direction arrows, for example.

Moreover, when the target interpupillary distance preset or stored for the respective user is reached, the name of the user may be output on the display. Thus, when the user is changed, the individual, optimal interpupillary distance may always be retrieved.

In addition, it is also conceivable that based on the interpupillary distance, user recognition is carried out if, for example, different interpupillary distances of different users are stored in the memory unit of the binoculars.

Optionally, in addition to an output on the display, a tactile output, for example in the form of a vibratory movement of the binoculars and/or an acoustic signaling may be carried out.

In this regard, the display offers combined output and visualization options, which are not only limited to the output of the interpupillary distance or the target interpupillary distance.

The display may be arranged in any position at the housing of the binoculars or at the focusing wheel.

According to a particular embodiment, it is possible that the display is coupled into a first observation beam path of the first housing half and/or into a second observation beam path of the second housing half.

This has the advantage that an observation through the binoculars does not have to be interrupted for quickly adjusting the interpupillary distance of a user.

According to an advantageous further development, it may be provided that a processor unit is formed, which comprises a first interface to the output device and a second interface to the detection device, wherein by means of the processor unit, the target interpupillary distance may be retrieved from a memory unit and compared to the interpupillary distance and wherein, if the target interpupillary distance is identical with the interpupillary distance, a signal output command may be transmitted to the output device.

In this connection, the binoculars may be operated as stand-alone electronic binoculars, which further allows quick adjustment of the interpupillary distance for a user.

Advantageously, a separate power supply unit is also provided in the binoculars for this purpose, such as a battery.

In particular, it may be advantageous if a user profile of a user comprising a user-related target interpupillary distance may be stored in the memory unit.

In this connection, the desired target interpupillary distance for a user of binoculars may be initially stored in the memory unit and retrieved when the binoculars are used.

For this purpose, a user input device may be provided at the binoculars, by means of which the user confirms or sets the desired target interpupillary distance when initially storing their user profile.

In this regard, multiple user profiles, which may be associated with different users, may advantageously be stored in the memory unit. In this connection, the selection of the respective user profile applicable or stored for the user may be carried out via the user input device, an indication on the display or a separate user recognition device arranged at the binoculars.

It is also conceivable in this connection that the user adjusts the interpupillary distance by pivoting the housing halves of the binoculars towards each other up to the folding angle that substantially corresponds to the optimal folding angle for the user. Based on this, identification of the user may be carried out, and the remaining fine adjustment of the folding angle or the target interpupillary distance may be carried out automatically. Thus, an easy, quick adjustment option may be created for the user.

It may further be provided that the user profile comprises a user-related diopter compensation value.

When the respective user profile has been selected or the user of binoculars has been recognized, further setting parameters for the user may be loaded from the memory unit. Apart from the diopter compensation value, these may include brightness settings, display settings, etc. Thus, when using the binoculars according to the invention, the user has the advantage that in addition to the interpupillary distance, further setting parameters may be retrieved or set quickly and comfortably.

Moreover, it may be provided that a wireless interface is formed, by means of which the binoculars may be coupled with a mobile terminal.

The wireless interface may, for example, be a Bluetooth, WIFI or NFC interface, by means of which the binoculars may be coupled with the mobile terminal.

The mobile terminal may, for example, be a smartphone, a PDA or a tablet computer.

After the binoculars have been coupled with the mobile terminal, a user profile for adjusting the optimal interpupillary distance may be loaded from the mobile terminal.

In this regard, the user profile may also comprise further information, such as a desired interpupillary distance or further setting parameters for the binoculars.

For this purpose, a separate application for the communication with the binoculars may also be installed on the mobile terminal. It is also conceivable that upon initialization of the desired target interpupillary distance of a user, an interpupillary distance in millimeters is entered in the application and subsequently transmitted to the binoculars.

Furthermore, an embodiment is advantageous according to which it may be provided that a user recognition device is provided, by means of which the user may be identified.

The user recognition device may be a fingerprint sensor, iris recognition or another type of detection device for biometric data of a user. As a result of the identification of a user, the respective target interpupillary distance may be set easily and quickly. In this connection, the setting may also be carried out automatically.

The invention further relates to a method for adjusting an interpupillary distance of binoculars, comprising the method steps of changing the interpupillary distance by pivoting a first housing half and/or a second housing half of the binoculars and detecting the interpupillary distance by a detection device.

Advantageously, in this connection, the current interpupillary distance is always known in the course of the adjustment. By means of an additional output device, a target interpupillary distance reached in the course of the adjustment of the interpupillary distance may be signaled, with the user receiving a visual, tactile and/or acoustic feedback that the optimal interpupillary distance provided for them has been reached.

Moreover, it may be appropriate if a folding angle between a first folding bridge portion and a second folding bridge portion coupled therewith is determined by means of a sensor device of the detection device and if the interpupillary distance is determined from the folding angle.

This way, the interpupillary distance may be derived or calculated quickly and easily from the folding angle and subsequently forwarded to an output device and output for the user.

In addition, it may be provided that the interpupillary distance is determined from the folding angle by means of trigonometrical calculations and/or an allocation table.

Thus, when the folding angle is known, the interpupillary distance may be advantageously easily calculated or derived by using mathematical standard formulae. Additionally or alternatively, an allocation table may also be stored in a memory unit of the binoculars, from which the respective interpupillary distances may be allocated to particular folding angles, which further facilitates easy and quick determination of the interpupillary distance.

Moreover, it may be provided that a first folding bridge angle of the first folding bridge portion and a second folding bridge angle of the second folding bridge portion are determined relative to a horizontal and that the folding angle is determined from the first folding bridge angle and the second folding bridge angle.

In this connection, apart from easily determining the folding angle, it is also possible to determine whether the binoculars are held in a horizontal alignment by the user, which may be relevant, for example, when initializing or storing a user-defined interpupillary distance.

According to a special embodiment, it is possible that the position of the binoculars relative to the horizontal is determined from the first folding bridge angle and the second folding bridge angle.

For adjusting the target interpupillary distance of a user, said distance must be stored once or initially, for example in the memory unit. For this purpose, the binoculars are preferably held horizontally. Furthermore, it is conceivable that a warning signal is output if the binoculars are not held horizontally in the course of an adjustment of the interpupillary distance.

According to an advantageous further development, it may be provided that when the target interpupillary distance is reached, signaling is carried out by an output device.

In particular, it may be advantageous if the target interpupillary distance is retrieved from a memory unit by means of a processor unit and compared to the interpupillary distance and, if it is identical with the target interpupillary distance, a signal output command is transmitted to the output device.

In this connection, the user of binoculars may directly receive a feedback as to whether the interpupillary distance desired by them has already been reached, which further facilitates easy, comfortable and quick adjustment of the binoculars.

It may further be provided that a user is identified by means of a user recognition device and that a user profile with user settings is loaded from the memory unit and that setting parameters selected from the group comprising the diopter compensation value, the brightness, the device functionality, the display layout are adapted based on the user settings.

This way, after the user has been identified, a number of desired user settings may be loaded with a single retrieval of a user profile. This has an advantageous effect on quickly putting the binoculars into operation.

In addition, it may be provided that the binoculars are coupled with a mobile terminal via a wireless interface and that data are mutually transmitted between the binoculars and the mobile terminal via the wireless interface.

After the binoculars have been coupled with the mobile terminal, a user profile for adjusting the optimal interpupillary distance may be loaded from the mobile terminal. In this regard, the user profile may also comprise further information, such as a desired interpupillary distance or further setting parameters for the binoculars.

For better understanding of the invention, the latter is explained in detail with reference to the following figures.

BRIEF DESCRIPTION OF THE DRAWINGS

The following is shown in highly simplified, schematic representation:

FIG. 1 binoculars with a detection device according to the invention and an output device;

FIG. 2 another embodiment of binoculars with another embodiment of a detection device and an output device;

FIG. 8 an embodiment of an allocation table;

FIG. 9 an allocation diagram for an allocation table according to FIG. 8;

DETAILED DESCRIPTION

Figure 3:
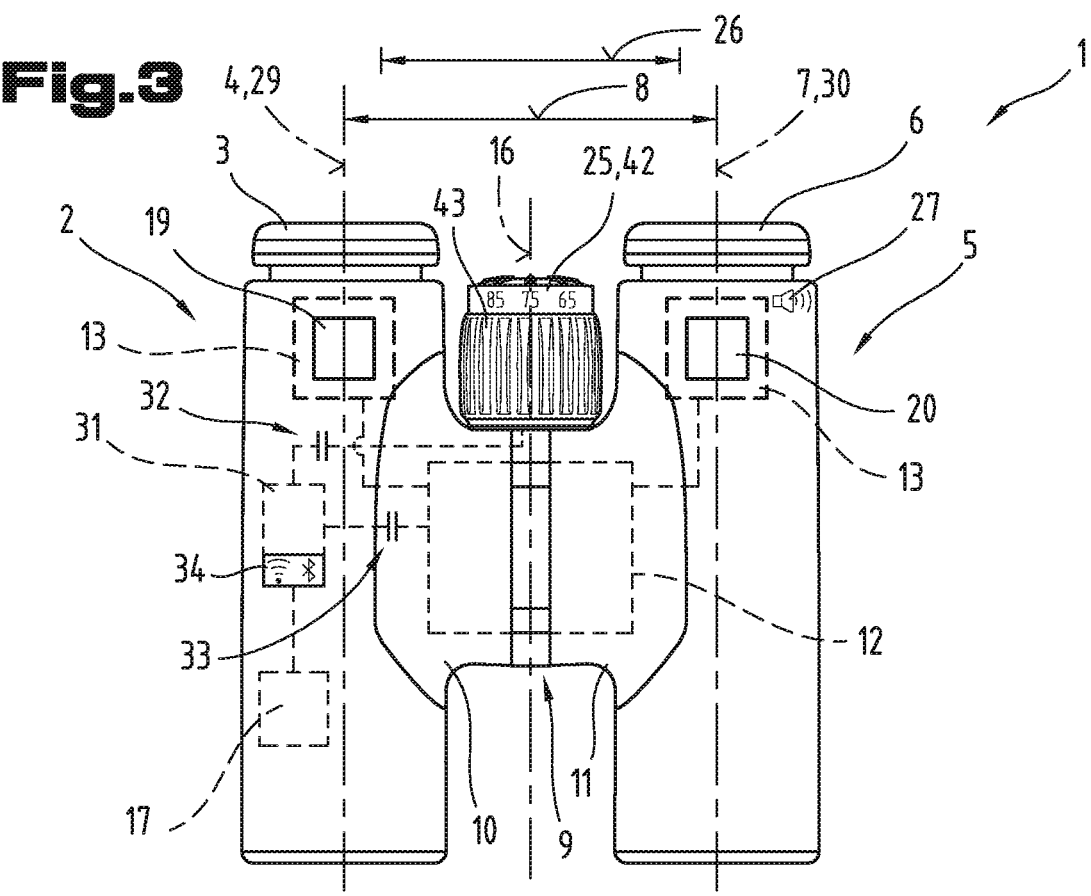
FIG. 3 another embodiment of binoculars with another embodiment of a detection device and an output device.

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

In FIG. 1, binoculars 1 are shown, comprising a first housing half 2 having a first eyepiece 3 and a first optical axis 4, and a second housing half 5 having a second eyepiece 6 and a second optical axis 7. The distance of the first optical axis 4 to the second optical axis 7 defines an interpupillary distance 8 in this regard. In the embodiment shown in FIG. 1, the first housing half 2 and the second housing half 5 are hingedly connected to each other by means of two folding bridges 9, wherein the folding bridges 9 each comprise a first folding bridge portion 10 coupled with the first housing half 2 and a second folding bridge portion 11 coupled with the second housing half 5.

By pivoting the two housing halves 2, 5, the interpupillary distance 8 may be changed and adapted to the individual requirements of a user of the binoculars 1. In this connection, by adapting the interpupillary distance 8, the binoculars 1 may be adjusted to the individual interocular or interpupillary distance of the user. In this regard, a detection device 12 is formed, by means of which the current interpupillary distance 8 may be determined. The course of adapting interpupillary distance 8 to the individual requirements of the user, the interpupillary distance 8 may be continuously detected by means of the detection device 12 in the course of the adjustment.

In the embodiment shown in FIG. 1, the detection device 12 comprises one sensor device 13 in each of the two folding bridges 9. By means of the sensor devices 13, a folding angle 14 between the first folding bridge portion 10 and the second folding bridge portion 11 coupled therewith may be determined in each of the two folding bridges 9, wherein the interpupillary distance 8 may be derived or calculated from the folding angle 14.

In contrast to the embodiment shown in FIG. 1, the sensor device 13 may also be provided in only one of the folding bridges 9 shown in FIG. 1.

In the case of multiple determination of the folding angles 14 between the first folding bridge portion 10 and the second folding bridge portion 11 coupled therewith, a comparison of the individual determined folding angles 14 is further provided, wherein possible measurement errors of the individual sensor devices 13 may be recognized and reduced.

In this regard, the interpupillary distance 8 may be determined from the folding angle 14 by means of trigonometrical calculations and/or an allocation table 45.

As a basis for performing the trigonometrical calculation, an isosceles triangle 15 is formed through the first optical axis 4, the second optical axis 7 and a folding bridge pivot axis 16 as corner points. For complete determination of the isosceles triangle 15, in addition to the determinable folding angle 14, the length of the first folding bridge portion 10 or the distance between the first optical axis 4 and the folding bridge pivot axis 16 on the one hand, and the length of the second folding bridge portion 11 or the distance between the second optical axis 7 and the folding bridge pivot axis 16 on the other hand are known.

Alternatively or in addition to the trigonometrical calculation of the interpupillary distance 8, an allocation table 45 may be stored in a memory unit 17 provided in the binoculars 1, by means of which particular folding angles 14 may be allocated to particular interpupillary distances 8.

In the embodiment shown in FIG. 1, the sensor devices 13 are configured as angle measurement sensors 18, by means of which the folding angle 14 between the first folding bridge portion 10 and the second folding bridge portion 11 coupled therewith may be determined.

In this regard, the sensor devices 13 comprise at least one first inclinometer 19 and a second inclinometer 20. In the embodiment shown in FIG. 1, the first inclinometer 19 is formed in the first folding bridge portion 10 coupled with the first housing half 2, and the second inclinometer 20 is formed in the second folding bridge portion 11 coupled with the second housing half 5.

In this regard, a first folding bridge angle 21 of the first folding bridge portion 10 and a second folding bridge angle 22 of the second folding bridge portion 11 may be determined relative to a horizontal 23. The first folding bridge angle 21 and the second folding bridge angle 22 together form the folding angle 14 of the folding bridge 9. From the first folding bridge angle 21 and the second folding bridge angle 22, the folding angle 14 may thus be determined.

If one now looks at the isosceles triangle 15 formed through the first optical axis 4, the second optical axis 7 and the folding bridge pivot axis 16, the first folding bridge angle 21 and the second folding bridge angle 22 can be found in relation to an axis of symmetry 24 of the triangle 15. If the first folding bridge angle 21 and the second folding bridge angle 22 are known, the triangle 15 may thus be again completely determined.

By means of an output device 25, an interpupillary distance 8 deviating from a target interpupillary distance 26 stored for the user may further be signaled. In the embodiment shown in FIG. 1, the current interpupillary distance 8 and the target interpupillary distance 26 are identical, and the interpupillary distance 8 desired or suitable for the user is adjusted between the first optical axis 4 and the second optical axis 7.

The output device 25 may be configured as an acoustic, optical and/or tactile signaling device 27, by means of which the target interpupillary distance 26 that may be reached in the course of the adjustment of the interpupillary distance 8 may be signaled.

In the embodiment according to FIG. 1, the output device 25 or optical signaling device 27 is configured as a display 28, on which the current interpupillary distance 8 may be seen. Moreover, the target interpupillary distance 26 reached in the course of adjusting the interpupillary distance 8 may be signaled. In this regard, the display 28 is coupled into a first observation beam path 29 of the first housing half 2.

Alternatively, according to an embodiment which is not shown in detail, the display 28 may be coupled into a second observation beam path 30 of the second housing half 5. Furthermore, it is also conceivable that parts of the display 28 are coupled into the first observation beam path 29, and parts of the display 28 are coupled into the second observation beam path 30.

In FIG. 1, it can also be seen that the binoculars 1 comprise a processor unit 31 comprising a first interface 32 to the output device 25 and a second interface 33 to the detection device 12. By means of the processor unit 31, the target interpupillary distance 26 may be retrieved from the memory unit 17 and compared to the interpupillary distance 8. If the target interpupillary distance 26 is identical with the interpupillary distance 8, a signal output command is transmitted to the output device 25, which is configured as a display 28 in the embodiment shown in FIG. 1. Thus, the user receives a signal that the target interpupillary distance 26 individually stored for them is being adjusted, which results in a pleasant viewing experience with the binoculars 1.

In the memory unit 17, a user profile of the user may be stored, which may also comprise further user-related setting values in addition to the user-related target interpupillary distance 26. Such setting values include, for example, the diopter compensation value, the brightness of the display 28, the layout or the information to be shown on the display 28, or other device functionalities.

Furthermore, the binoculars 1 may be coupled with a mobile terminal 35 via a wireless interface 34. For this purpose, a wireless connection 36 may be established between the binoculars 1 and the mobile terminal 35, by means of which, on the one hand, data may be mutually transmitted, and communication between the binoculars 1 and the mobile terminal 35 is enabled.

In this connection, the mobile terminal 35 may be a smartphone, a PDA or a tablet computer carried by the user.

Alternatively or additionally to the user profile stored in the memory unit 17, user setting parameters may also be stored on the mobile terminal 35. In this connection, in the scope of coupling the binoculars 1 with the mobile terminal 35, a user profile may again be loaded, and the binoculars 1 may be adjusted according to the user requirements.

Finally, in the embodiment shown in FIG. 1, a user recognition device 37 is provided, by means of which the user may be identified. Said user recognition device may be a biometric user recognition device 37, such as a fingerprint sensor 38. If a user is recognized by the user recognition device 37, the applicable user profile may be loaded from the memory unit 17 based on this information, and the target interpupillary distance 26 may be adjusted.

In FIG. 2, another, possibly independent embodiment of the binoculars 1 is shown, wherein identical reference numbers or component names as in preceding FIG. 1 are again used for identical parts. To avoid unnecessary repetition, reference is made to the detailed description in preceding FIG. 1.

The binoculars 1 shown in FIG. 2 are foldable compact binoculars 39 with a detection device 12 and an output device 25 for an interpupillary distance 8 or a target interpupillary distance 26. In the compact binoculars 39, the first housing half 2 and the second housing half 5 are hingedly connected to each other by means of a folding bridge 9, wherein the folding bridge 9 comprises a first folding bridge portion 10 coupled with the first housing half 2 and a second folding bridge portion 11 coupled with the second housing half 5. The first folding bridge portion 10 and the second folding bridge portion 11 are hingedly connected to each other by means of a connecting bridge 40.

By pivoting the two housing halves 2, 5, the interpupillary distance 8 may in turn be changed and adapted to the individual requirements of a user of the compact binoculars 39. By means of a detection device 12, the interpupillary distance 8 may be detected in the course of the adjustment, wherein a first folding angle 14 between the first folding bridge portion 10 and the connecting bridge 40 may be determined, and furthermore a second folding angle 14' between the second folding bridge portion 11 and the connecting bridge 40 may be determined. For this purpose, the detection device 12 comprises a sensor device 13, wherein in the first folding bridge portion 10, a first inclinometer 19 is provided, and in the second folding bridge portion 11, a second inclinometer 20 is provided.

The interpupillary distance 8 may be determined from the first folding angle 14 and the second folding angle 14' by means of trigonometrical calculations and/or an allocation table 45.

When a trigonometrical calculation is performed, a trapezoid 41 is formed through the first optical axis 4, the second optical axis 7 and the pivot axes of the first folding bridge portion 10 and the second folding bridge portion 11 as corner points. For complete determination of the trapezoid 41, apart from the first folding angle 14 and the second folding angle 14', the length of the connecting bridge 40, the distance between the first optical axis 4 and the first folding bridge pivot axis 16, and the distance between the second optical axis 7 and the second folding bridge pivot axis 16' are known.

In FIG. 3, another, possibly independent embodiment of the binoculars 1 is shown, wherein identical reference numbers or component names as in preceding FIGS. 1 and 2 are again used for identical parts. To avoid unnecessary repetition, reference is made to the detailed description in preceding FIGS. 1 and 2.

The binoculars 1 shown in FIG. 3 again comprise a first housing half 2 and a second housing half 5, which are hingedly connected to each other by means of a folding bridge 9 in the embodiment shown. The folding bridge 9 comprises a first folding bridge portion 10 coupled with the first housing half 2 and a second folding bridge portion 11 coupled with the second housing half 5.

In the embodiment shown in FIG. 3, the detection device 12 comprises one sensor device 13 in the first housing half 2 and one sensor device 13 in the second housing half 5. By means of the sensor devices 13, which are configured as a first inclinometer 19 in the first housing half 2 and a second inclinometer 20 in the second housing half 5, a folding angle 14 between the first folding bridge portion 10 and the second folding bridge portion 11 coupled therewith may be determined, wherein the interpupillary distance 8 may in turn be derived or calculated from the folding angle 14.

By means of an output device 25 in the form of a scale 42 at a focusing wheel 43, the currently adjusted interpupillary distance 8 is shown. In this regard, the focusing wheel 43 may be configured in two parts with multiple rotary drives.

If the interpupillary distance 8 is identical with the target interpupillary distance 26, this may also be shown on the scale 42, which is coupled with a rotary drive for adjusting the interpupillary distance 8.

Alternatively, a tactile feedback to the user of the binoculars 1 is conceivable, wherein reaching of the target interpupillary distance 26 is signaled by the two-part focusing wheel locking at a defined position.

Reaching of the target interpupillary distance 26 may also be signaled by a separate acoustic signaling device 27.

Figure 4:
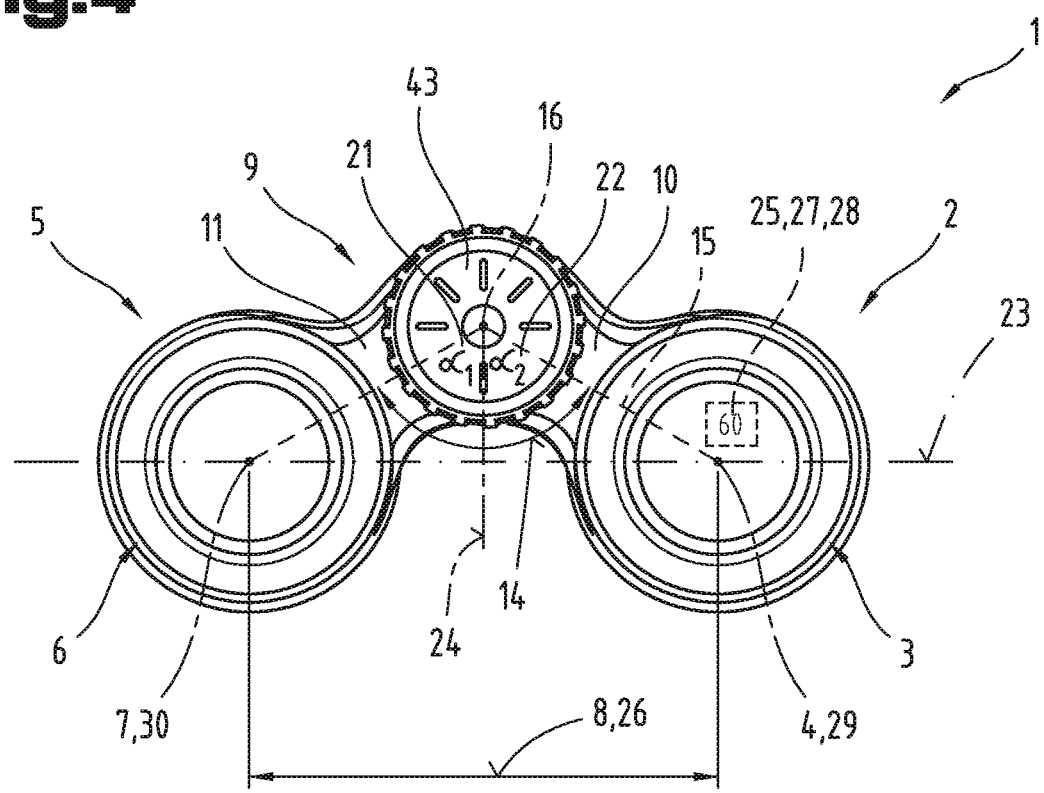
FIG. 4 side view of the binoculars according to FIG. 1, viewed from the side of the eyepiece.

In FIG. 4, a side view of the binoculars 1 according to FIG. 1 is shown, viewed from the side of the eyepiece, wherein identical reference numbers or component names as in preceding FIGS. 1-3 are again used for identical parts. To avoid unnecessary repetition, reference is made to the detailed description in preceding FIGS. 1-3.

As already described in connection with FIG. 1, an interpupillary distance 8 may be determined from the folding angle 14 by means of trigonometrical calculations and/or an allocation table 45.

As can be seen in FIG. 4, a triangle 15 is formed through the first optical axis 4, the second optical axis 7 and a folding bridge pivot axis 16 of the binoculars 1 as corner points. The isosceles triangle 15 serves as a basis for performing a trigonometrical calculation.

For complete determination of the isosceles triangle 15, the length of the first folding bridge angle 10 on the one hand, and the length of the second folding bridge angle 11 on the other hand are known in addition to the folding angle 14 determinable by means of a detection device 12 or sensor devices 13.

The distance between the first optical axis 4 and the folding bridge pivot axis 16 may also be considered the length of the first folding bridge portion 10, and the distance between the second optical axis 7 and the folding bridge pivot axis 16 may be considered the length of the second folding bridge portion 11.

If one now once again looks at the isosceles triangle 15 formed through the first optical axis 4, the second optical axis 7 and the folding bridge pivot axis 16, the first folding bridge angle 21 and the second folding bridge angle 22 can be found in relation to an axis of symmetry 24 of the triangle 15. If the first folding bridge angle 21 and the second folding bridge angle 22 are known, the triangle 15 may thus be further completely determined.

Figure 5:
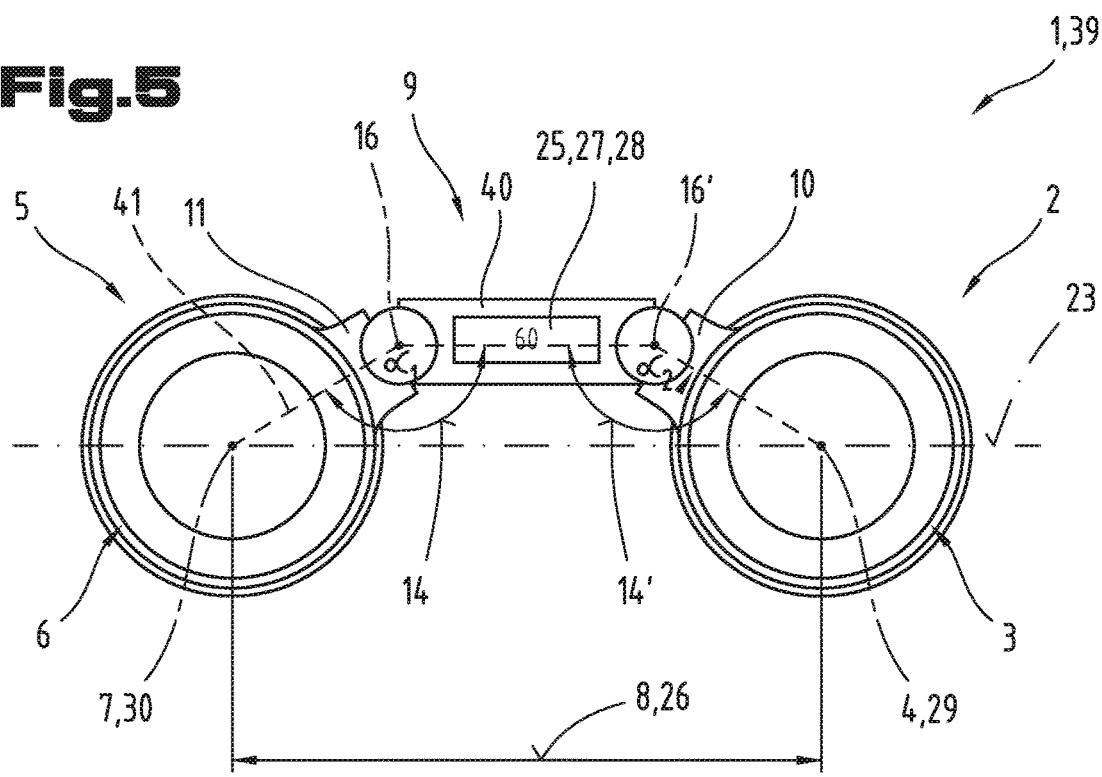
FIG. 5 side view of the binoculars according to FIG. 2, viewed from the side of the eyepiece.

In FIG. 5, a side view of the binoculars 1 according to FIG. 2 is shown, viewed from the side of the eyepiece, wherein identical reference numbers or component names as in preceding FIGS. 1-4 are again used for identical parts. To avoid unnecessary repetition, reference is made to the detailed description in preceding FIGS. 1-4.

The binoculars 1 shown in FIG. 5 are compact binoculars 39, wherein the first housing half 2 and the second housing half 5 are hingedly connected to each other by means of a folding bridge 9. The folding bridge 9 comprises a first folding bridge portion 10 coupled with the first housing half 2 and a second folding bridge portion 11 coupled with the second housing half 5. The first folding bridge portion 10 and the second folding bridge portion 11 are hingedly connected to each other by means of a connecting bridge 40.

As a basis for performing the trigonometrical calculation for determining the interpupillary distance 8, a trapezoid 41 is formed through the first optical axis 4, the second optical axis 7 and the pivot axes of the first folding bridge portion 10 and the second folding bridge portion 11 as corner points. For complete determination of the trapezoid 41, apart from the first folding angle 14 and the second folding angle 14', the length of the connecting bridge 40, the distance between the first optical axis 4 and the first folding bridge pivot axis 16, and the distance between the second optical axis 7 and the second folding bridge pivot axis 16' are known.

Figure 6:
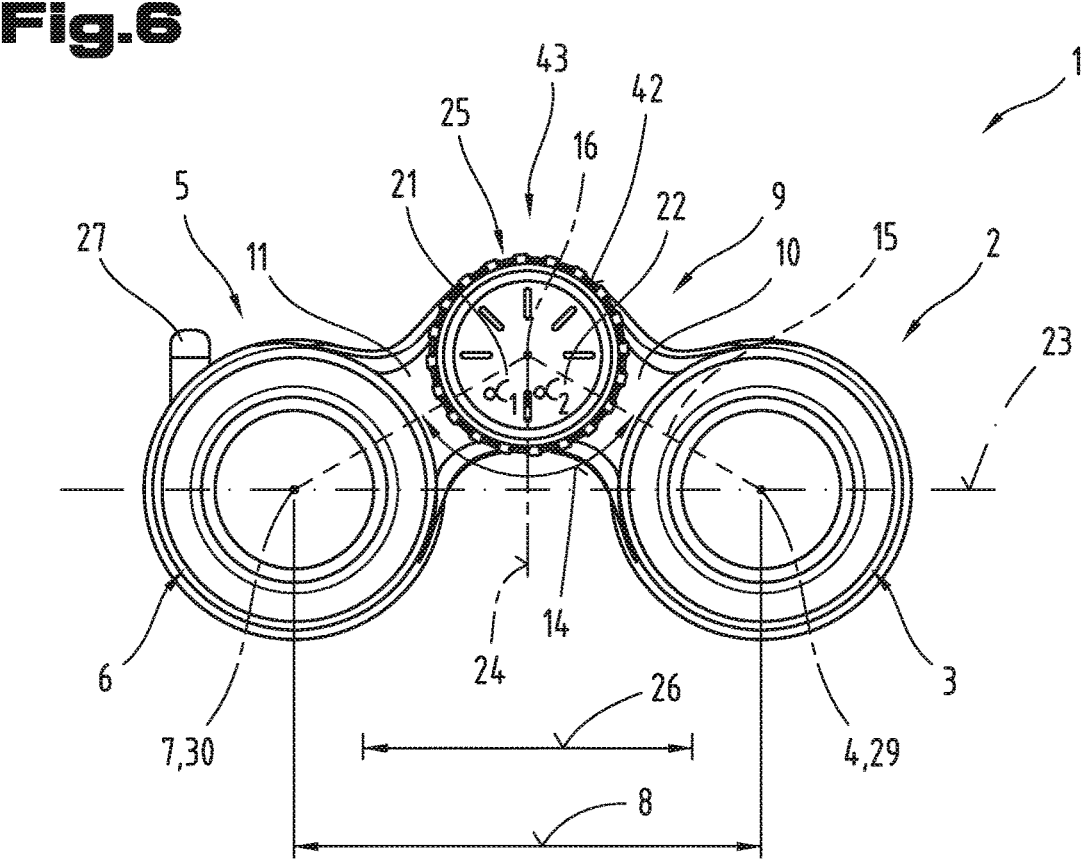
FIG. 6 side view of the binoculars according to FIG. 3, viewed from the side of the eyepiece.

In FIG. 6, a side view of the binoculars 1 according to FIG. 3 is shown, viewed from the side of the eyepiece, wherein identical reference numbers or component names as in preceding FIGS. 1-5 are again used for identical parts. To avoid unnecessary repetition, reference is made to the detailed description in preceding FIGS. 1-5.

An isosceles triangle 15 is again formed through the first optical axis 4, the second optical axis 7 and a folding bridge pivot axis 16 of the binoculars 1 as corner points, which serves as a basis for performing a trigonometrical calculation.

For complete determination of the isosceles triangle 15, the length of the first folding bridge angle 10 on the one hand, and the length of the second folding bridge angle 11 on the other hand are known in addition to the folding angle 14 determinable by means of a detection device 12 or sensor devices 13.

If one now once again looks at the isosceles triangle 15 formed through the first optical axis 4, the second optical axis 7 and the folding bridge pivot axis 16, the first folding bridge angle 21 and the second folding bridge angle 22 can be found in relation to an axis of symmetry 24 of the triangle 15. If the first folding bridge angle 21 and the second folding bridge angle 22 are known, the triangle 15 may thus be further completely determined.

Figure 7:
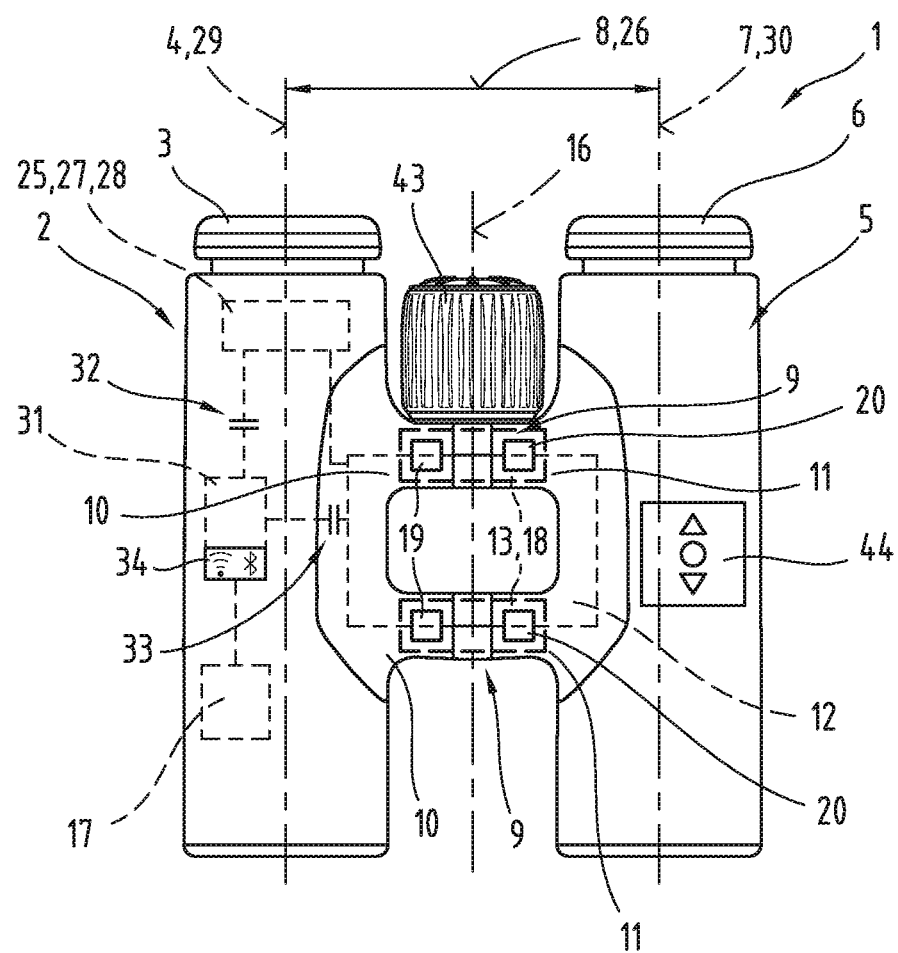
FIG. 7 another embodiment of binoculars with a user input device.

In FIG. 7, another, possibly independent embodiment of the binoculars 1 is shown, wherein identical reference numbers or component names as in preceding FIGS. 1-6 are again used for identical parts. To avoid unnecessary repetition, reference is made to the detailed description in preceding FIGS. 1-6.

The binoculars 1 shown in FIG. 7 are electronic binoculars 1, comprising a user input device 44. By means of the user input device 44, a user may select a user profile by means of a user dialog shown on the display 28 and load it from a memory unit 17.

Based on the selected user profile, the target interpupillary distance 26 desired for the user may now be automatically adjusted in order to provide a pleasant viewing and observation experience for the user.

Furthermore, by means of the user profile, setting parameters of the binoculars 1, such as the diopter compensation value, the brightness, the device functionality, the display layout, etc. may be automatically adapted based on the user settings.

In FIG. 8, an allocation table 45 for the interpupillary distance 8 of binoculars 1 is shown, wherein identical reference numbers or component names as in preceding FIGS. 1-7 are again used for identical parts. To avoid unnecessary repetition, reference is made to the detailed description in preceding FIGS. 1-7.

According to the embodiment shown, the interpupillary distance 8 may be determined from the allocation table 45.

A triangle 15 is again formed through the first optical axis 4, the second optical axis 7 and a folding bridge pivot axis 16 of the binoculars 1 as corner points. The isosceles triangle 15 serves as a basis for deriving the interpupillary distance 8 from a folding angle 14.

For complete determination of the isosceles triangle 15, in addition to the folding angle 14 determinable by means of a detection device 12 or sensor devices 13, the length 46 of the first folding bridge portion 10 on the one hand, and the length 46' of the second folding bridge portion 11 on the other hand are known.

The distance between the first optical axis 4 and the folding bridge pivot axis 16 may also be considered the length 46 of the first folding bridge portion 10, and the distance between the second optical axis 7 and the folding bridge pivot axis 16 may be considered the length 46' of the second folding bridge portion 11.

In the embodiment shown in FIG. 8, the first folding bridge portion 10 and the second folding bridge portion 11 are of equal length, wherein the length 46, 46' of the folding bridge portions 10, 11 is 40 mm according to the embodiment.

If, for example, a folding angle 14 of 80° is now determined, an interpupillary distance 8 of 51.4 mm is allocated to the determined folding angle 14 by means of the allocation table 45. Further examples for the allocation of a folding angle 14 to an interpupillary distance 8 can be found in the allocation table 45 shown in FIG. 8, wherein the allocation table 45 applies to the length 46, 46' of the folding bridge portions 10, 11 of 40 mm.

Finally, in FIG. 9, an allocation diagram 47 for an allocation table 45 according to FIG. 8 is shown, wherein identical reference numbers or component names as in preceding FIGS. 1-8 are again used for identical parts. To avoid unnecessary repetition, reference is made to the detailed description in preceding FIGS. 1-8.

In FIG. 10, an embodiment for determining a folding angle 14 of binoculars 1 and the tilt from a measurement of the inclination of a first housing half 2 and a second housing half 5 is shown.

In the embodiment, all mentioned angles are counted such that clockwise rotation is positive and counter-clockwise rotation of the angle is negative.

Figure 10A:
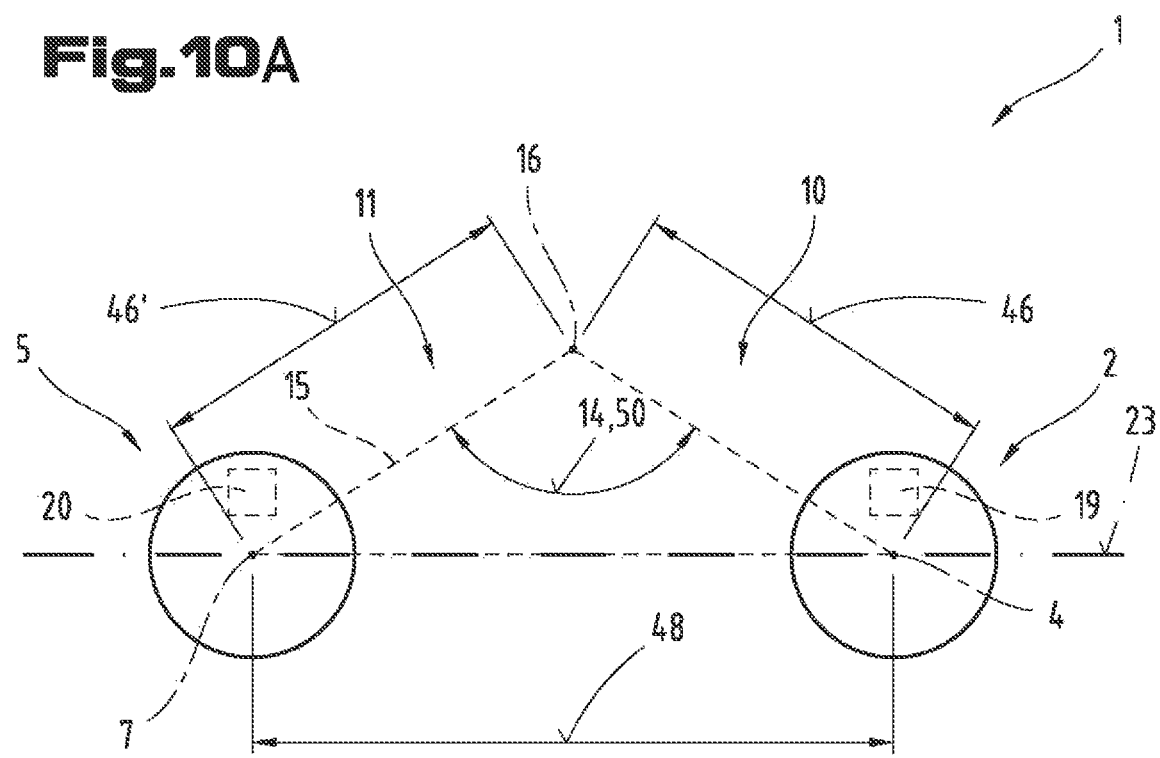
FIGS. 10a-10d an embodiment for determining a folding angle from the measurement of the inclination of a first housing half and a second housing half.

According to FIG. 10a, in the first housing half 2, a first inclinometer 19, and in the second housing half 5, a second inclinometer 20 are provided, wherein the first inclinometer 19 and the second inclinometer 20 are stationary in the first housing half 2 and the second housing half 5, respectively. In this regard, the first inclinometer 19 and the second inclinometer 20 are calibrated such that, in a horizontal position in relation to a horizontal 23 and with a reference interpupillary distance 48, they display a measurement value of zero for the respective associated inclination angles 55, 56 (e.g. if the length 46, 46' of the first folding bridge portion 10 and the second folding bridge portion 11 is 40 mm, a reference interpupillary distance 48 is 65 mm and an associated reference folding angle 50 is 108.7°).

Figure 10B:
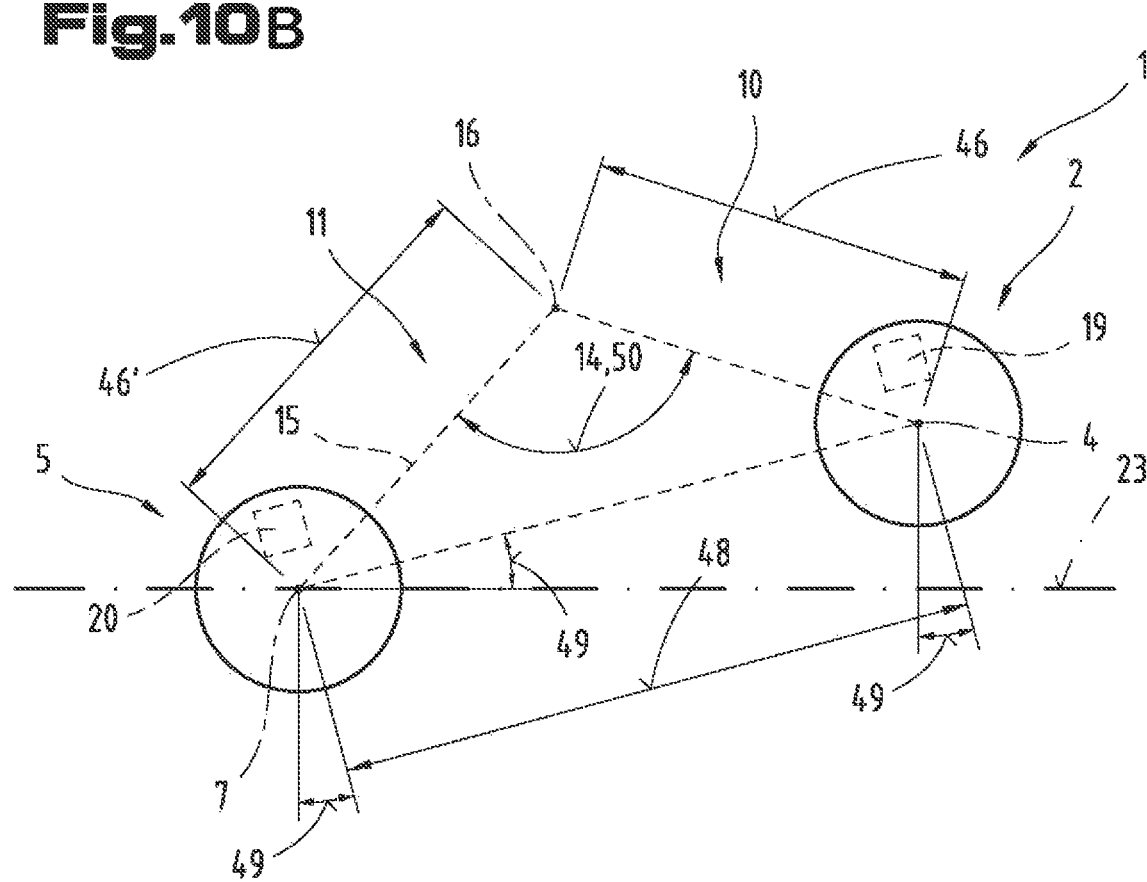

If, as is now shown in FIG. 10b, the binoculars 1 are tilted or rotated in relation to the horizontal 23, the inclination angle 49 changes.

Figure 10C:
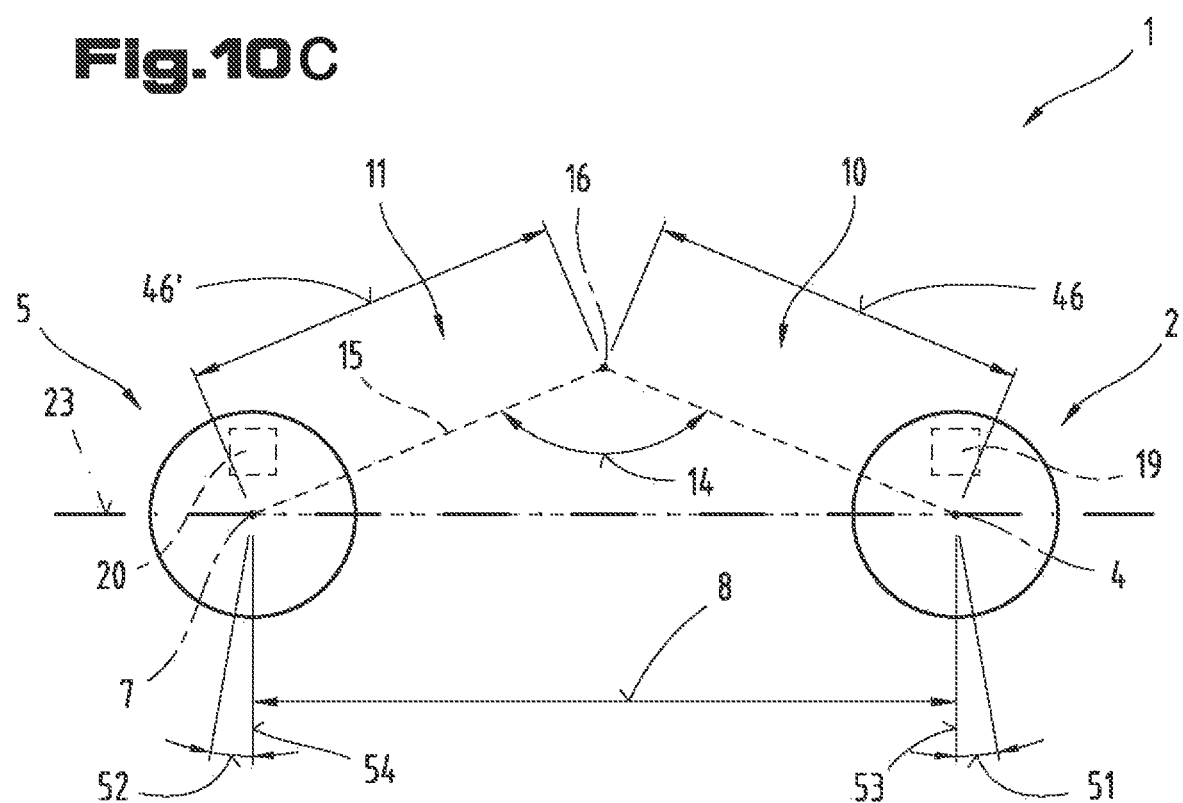

According to the representation in FIG. 10c, the first inclination angle 55 is adjusted or changed by a first adjusting angle 51 of the first housing half 2, and the second inclination angle 56 by a second adjusting angle 52 of the second housing half 5 by changing the interpupillary distance 8. In this regard, the first adjusting angle 51 relates to a first normal 53 perpendicular to the horizontal 23, wherein the first normal 53 is also perpendicular to a first optical axis 4. The second adjusting angle 52 relates to a second normal 54 perpendicular to the horizontal 23, wherein the second normal 54 is also perpendicular to a second optical axis 7.

Figure 10D:
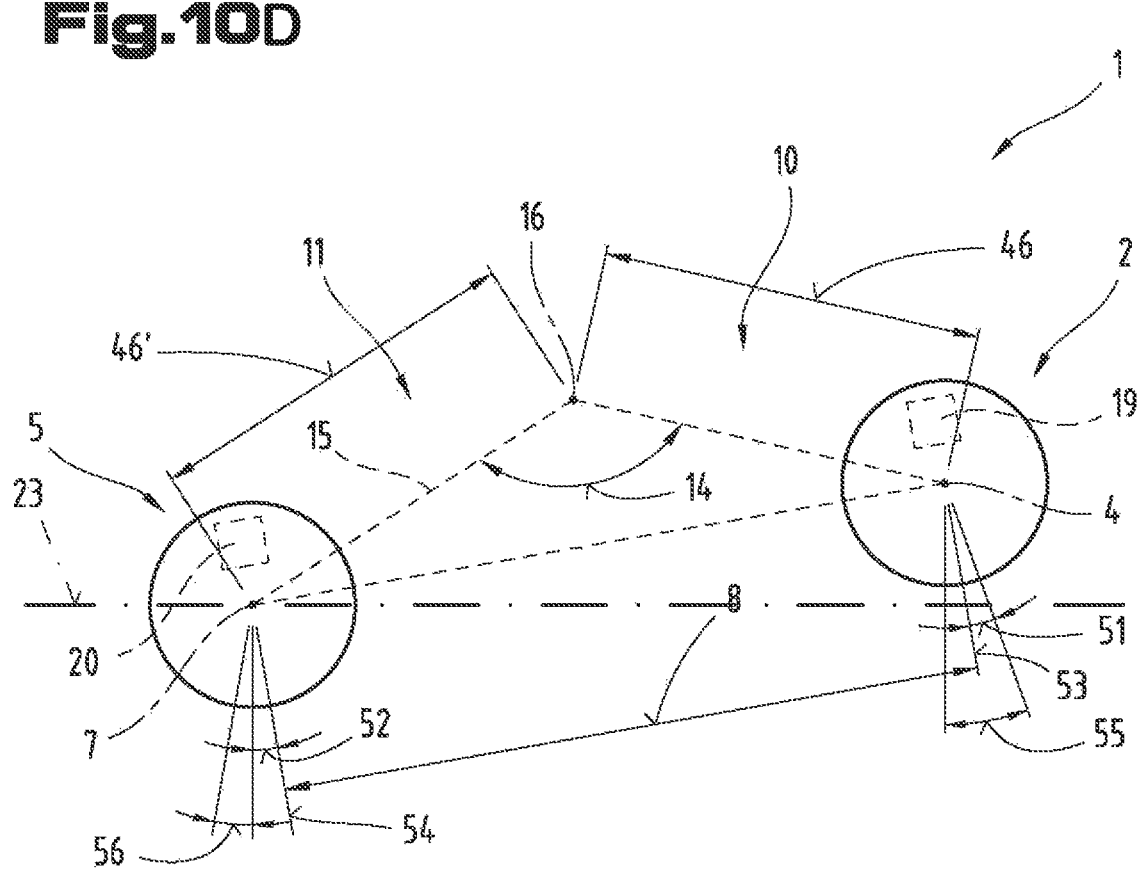

In FIG. 10d, simultaneous tilting of the binoculars 1 and changing of the interpupillary distance 8 are shown. In this regard, by means of the first inclinometer 19, a first inclination angle 55 may be determined, and by means of the second inclinometer 20, a second inclination angle 56 may be determined.

From the first inclination angle 55 and the second inclination angle 56, the tilting angle 49 and the folding angle 14 may be determined, wherein in the following formulae $\theta_1$ refers to the second inclination angle 56
$\theta_2$ refers to the first inclination angle 55
$\delta_1$ refers to the second adjusting angle 52
$\delta_2$ refers to the first adjusting angle 51
$\beta$ refers to the tilting angle 49
$\gamma$ refers to the folding angle 14
$\gamma_{ref}$ refers to the reference folding angle 50

With the aid of the known first inclination angle 55 and the known second inclination angle 56, the following equations may be formulated:

$$\theta_1 = \delta_1 + \beta$$

$$\theta_2 = \delta_2 + \beta$$

$$\delta_1 = -\delta_2$$

From this, the folding angle 14 may be calculated as follows:

$$\beta = \tfrac{1}{2} * (\theta_1 + \theta_2)$$

$$\delta_1 = \tfrac{1}{2} * (\theta_1 - \theta_2)$$

$$\gamma = \gamma_{ref} + 2\delta_1 = \gamma_{ref} + \theta_1 - \theta_2$$

With the aid of the folding angle 14, the interpupillary distance 8 may now be determined.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10; i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

The invention claimed is:

1. Binoculars comprising:
a first housing half having a first eyepiece with a first optical axis;
a second housing half having a second eyepiece with a second optical axis;
wherein the distance of the first optical axis to the second optical axis defines an interpupillary distance;
wherein the first housing half and the second housing half are hingedly connected to each other by means of at least one folding bridge, wherein the folding bridge comprises a first folding bridge portion coupled with the first housing half and a second folding bridge portion coupled with the second housing half forming a folding angle between the first folding bridge portion and the second folding bridge portion;
wherein the interpupillary distance is adjustable by pivoting the two housing halves;
wherein a detection device with a first inclinometer and a second inclinometer is formed, wherein the first inclinometer is located in the first housing half and/or the first folding bridge portion coupled therewith and the second inclinometer is located in the second housing half and/or the second folding bridge portion coupled therewith; and wherein the first inclinometer and the second inclinometer are configured to determine a first folding bridge angle of the first folding bridge portion and a second folding bridge angle of the second folding bridge portion relative to a horizontal; and wherein the detection device is configured to determine the folding angle based on the first folding bridge angle and the second folding bridge angle, and the interpupillary distance based on the folding angle.

2. The binoculars according to claim 1, wherein the interpupillary distance is determined based on the folding angle by means of trigonometrical calculations and/or an allocation table.

3. The binoculars according to claim 1, wherein the position of the binoculars relative to the horizontal is determinable from the first folding bridge angle and the second folding bridge angle.

4. The binoculars according to claim 1, wherein a wireless interface is formed, by means of which the binoculars are coupled with a mobile terminal.

* * * * *